United States Patent
Werner et al.

(10) Patent No.: US 6,508,577 B2
(45) Date of Patent: Jan. 21, 2003

(54) REAR LIGHT UNIT FOR A VEHICLE AND CIRCUIT THEREFOR

(75) Inventors: Michael Werner, Braunschweig (DE); Michael Muller, Gifhorn (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/854,734

(22) Filed: May 14, 2001

(65) Prior Publication Data

US 2001/0055211 A1 Dec. 27, 2001

Related U.S. Application Data

(63) Continuation of application No. PCT/EP99/08109, filed on Oct. 27, 1999.

(30) Foreign Application Priority Data

Nov. 12, 1998 (DE) .......................................... 198 52 311

(51) Int. Cl.[7] .................................................. B60Q 1/26
(52) U.S. Cl. ....................... 362/544; 362/518; 362/240; 340/479; 340/469
(58) Field of Search ................................ 362/517, 487, 362/518, 240, 241, 244, 247, 543, 544, 522, 243, 245, 211, 212, 215; 340/469, 468, 479, 464

(56) References Cited

U.S. PATENT DOCUMENTS

| 4,831,503 A | * | 5/1989 | DeSantis et al. ............. 362/497 |
| 4,851,810 A | * | 7/1989 | Vitale et al. ................. 362/240 |
| 5,055,983 A | * | 10/1991 | Hunold et al. .............. 362/544 |

FOREIGN PATENT DOCUMENTS

| DE | 2522608 | 12/1975 |
| DE | 3431772 | 4/1986 |
| DE | 4120893 | 1/1993 |
| EP | 0104798 | 4/1984 |
| EP | 0442095 | 8/1991 |

* cited by examiner

Primary Examiner—Sandra O'Shea
Assistant Examiner—Hargobind S. Sawhney
(74) Attorney, Agent, or Firm—Baker Botts LLP

(57) ABSTRACT

A rear light unit for a vehicle including a plurality of reflectors and bulbs assigned for forming a rear light, a brake light and a rear fog light. The invention aims to provide a rear light unit which is more compact for an identical number of signal lights. To this end the rear light is made up of a row of four reflectors and bulbs, at least two of which reflectors have bulbs with two power levels. One reflector together with a bulb switched to the higher power level forms the brake light while the other forms the rear fog light. The reflectors are arranged at a distance from each other which complies with the legally required minimum separation between the brake light and rear fog light.

9 Claims, 6 Drawing Sheets

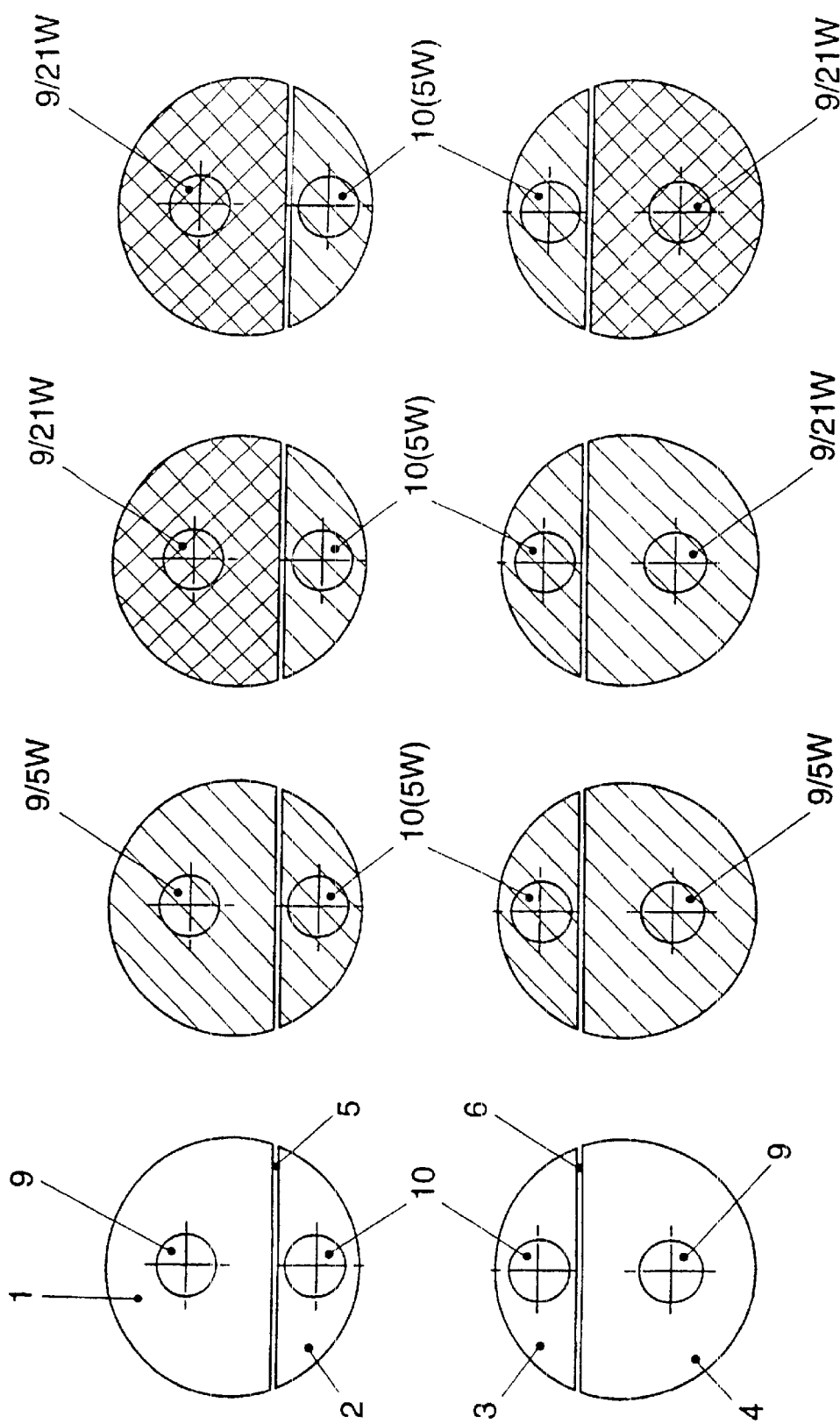

REAR LIGHT UNIT FOR A VEHICLE AND CIRCUIT THEREFOR

This is a continuation of application No. PCT/EP99/08109, filed Oct. 27, 1999.

BACKGROUND OF THE INVENTION

The invention relates to a rear light unit for a vehicle, especially for a passenger car, having a plurality of reflectors, and bulbs associated therewith, for providing a taillight, a brake light and a rear fog light, and optionally having bulbs for additional lamps, and a circuit for operating the rear light unit.

Vehicles currently have rear light units in which a plurality of reflectors and bulbs associated therewith, are combined in what is known as a multiple chamber light, wherein a separate chamber with a reflector is formed for each signal light. The reflectors are associated with individual sections of a lens plate which covers this multiple chamber light and is set into an opening of the car body and is mounted flush therewith. Arranged ahead of the lens plate sections for the taillight, brake light and rear fog light is a specially designed optical plate, having adjacent, horizontally oriented cylinder lenses that collect the light emitted by the bulb and incident parallel upon them and provide for adequate vertical dispersion. A rear light unit of this nature is described in EP 0,422,095 A2.

Due to the large number of chambers equipped with reflectors that are to be accommodated, and the minimum separation required in some countries between the brake light and the rear fog light, the rear light unit may occupy a commensurately large area on the rear of the vehicle, which can be perceived as visually unattractive, depending on the size of the vehicle.

It is the object of the invention to create a rear light unit which, with the same number of signal lights, improves the design options and permits a compact arrangement, and also a circuit for operating the same.

SUMMARY OF THE INVENTION

According to the invention a rear light unit is composed of at least four reflectors and bulbs, at least two of the bulbs having two levels of illumination. The high output level of one bulb provides a brake light and the high output level of the other provides a rear fog light. The two reflectors having two level bulbs are arranged apart at a spacing that corresponds to at least the minimum spacing required between the brake light and rear fog light. A number of reflectors serve multiple roles in this way, resulting in new design options and also a compact arrangement of the lights. In this context, the reflectors for the taillight, brake light and rear fog light can be arranged as four lights in a row, forming two reflector pairs of which the two outermost reflectors are provided to form the brake light and the rear fog light and have bulbs with two output levels.

In a further embodiment, all reflectors are provided with bulbs with two output levels, and together operate as the brake light when the rear fog light, is not in use. When the rear fog light is in use, only one outer reflector is used to form the brake light, while the outer reflector at the opposite end of the row of reflectors acts as the fog light. Accordingly, the prescribed minimum separation between brake light and rear fog light is provided.

For the brake light and the rear fog light, dual filament lamps may be used to provide two output levels. When all reflectors forming the rear light are used simultaneously to form the brake light, all reflectors are equipped with dual filament lamps. Where only one end reflector is used, only the outermost reflectors need to have dual filament lamps.

To create an attractive appearance, the reflectors can be arranged in two pairs such that the back of the pairs of reflectors form a circular area in the plan view. The wall separating the reflectors is preferably a straight web, which can be formed off-center in the circular area, where the end reflectors forming the brake light and rear fog light are each larger than the other, inside reflectors with which they are respectively paired. The separating walls of the two reflector pairs are parallel and arranged with at least the required minimum separation between the brake light and the rear fog light.

In a preferred arrangement, the reflector pairs can be arranged so that they are spaced vertically one above another, with the separating walls oriented horizontally. The reflector for the back-up light is preferably arranged in the space between the reflector pairs, and the reflector for the turn signal can be arranged horizontally adjacent thereto, preferably on the outside. In each case, the rear light unit is curved towards the fender in such a way that the lights, especially the signal lights, can also be seen from the side.

A cylindrical dispersion lens may be associated with the central reflectors of the row of four reflectors, the reflector for the rear fog light, and the brake light. The lenses are preferably formed in the proper color.

In accordance with the invention a circuit is provided for operating a rear light unit having lamps adjacent four reflectors which form the taillight, the brake light and the rear fog light, wherein a bulb with two output levels is associated with each reflector and wherein the output levels are operated either individually or in combination. The circuit includes a brake light switch and a fog light switch having two positions. In a first position of the fog light switch, a first lamp corresponding to the rear fog light is switched on to a high illumination. The brake light switch is connected to provide power to a second lamp when activated. In a second position of the fog light switch, the high illumination of the first lamp is turned off and the brake light switch is connected to provide power to all four lamps when activated.

A diode may be provided for the connection between the brake light switch and the first rear light when the fog light switch is in the second position. A diode may also be provided between the brake light switch and the second rear light when the fog light switch is in the first position.

All of these circuit arrangements make it possible to operate the rear light unit in accordance with the invention, using simple circuitry, with the legally required minimum separation between the brake light and the rear fog light, in a compact arrangement with a variety of design options.

The invention is explained below on the basis of a rear light unit for a passenger car.

BRIEF DESCRIPTION OF THE DRAWING

FIGS. 3a–3d show operation of the taillight, brake light and rear fog light in the rear light unit from FIG. 1 in different operating states.

DETAILED DESCRIPTION OF THE INVENTION

Figure 2:
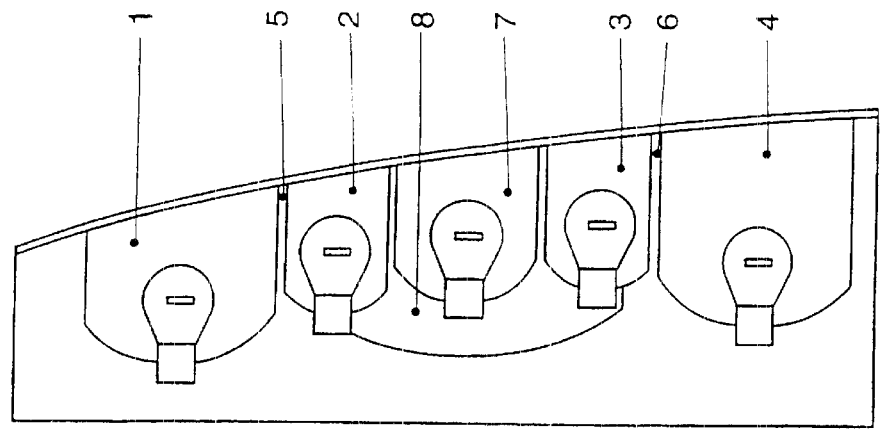
FIG. 2 is a vertical section II—II through the rear light unit.
Figure 1:
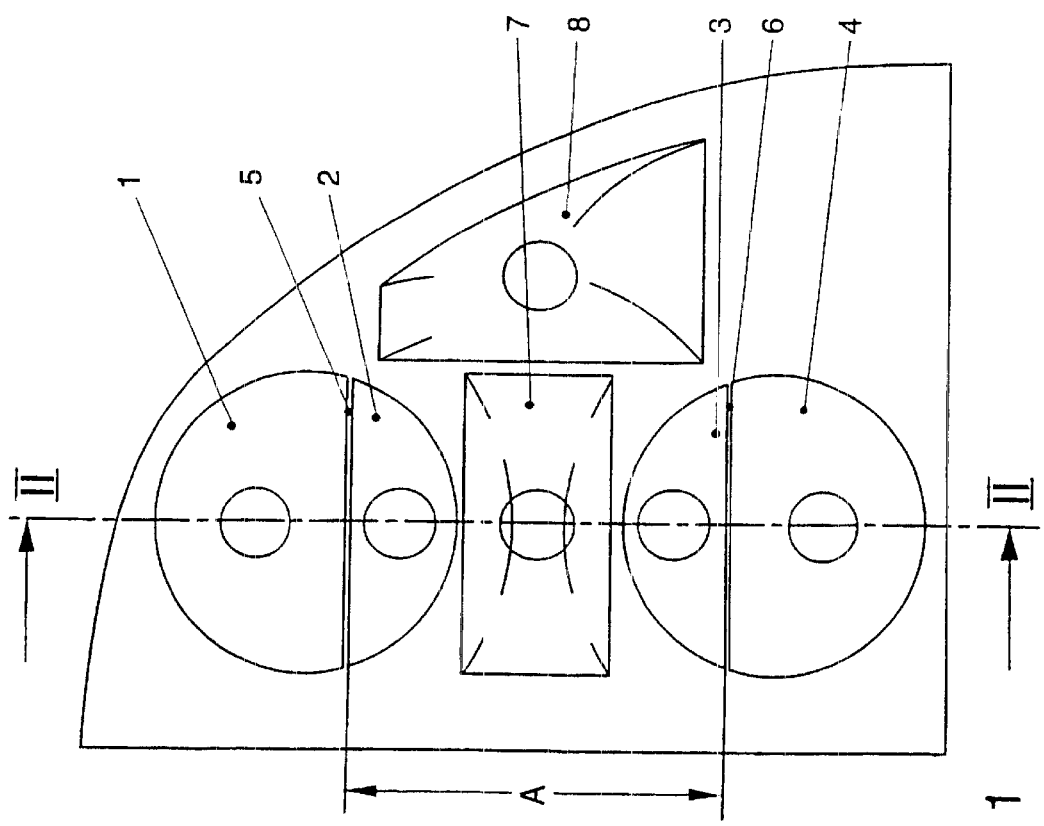
FIG. 1 is an elevation plan view of the rear light unit.

FIGS. 1 and 2 show a rear light unit in accordance with one embodiment of the invention for a passenger vehicle in an elevation plan view as appears at the rear end of the vehicle, and in cross-section. The rear light unit has four reflectors 1 through 4 to form the taillight, of which the reflectors 1 and 2 and the reflectors 3 and 4 are each combined into pairs, and arranged vertically one above the other. Each reflector pair forms a circular area, wherein the reflectors 1 and 2 or 3 and 4 are separated off-center from one another, due to their different size, by a separating wall 5 or 6, which appears as a web. The two outer reflectors 1 and 4 are used to form respectively the brake light and rear fog light. The separating walls 5 and 6 are arranged at the legally required minimum separation (A) between the brake light and rear fog light of 100.2 mm in Germany. Located between the two reflector pairs is a fifth reflector 7 for the back-up light. Adjacent to reflector 7 and on the side toward the outside of the vehicle, there is provided a sixth reflector 8 for the turn signal light.

FIGS. 3a–3d and 4a–4d show operation of the lamps in the two reflector pairs ½ and ¾ to form the taillight, brake light and rear fog light in various operating states. In FIGS. 3a–3d, the reflectors 1 and 4 are each equipped with a dual filament lamp 9 with illumination outputs of 5 W and 21 W, and the reflectors 2 and 3 are each equipped with a single filament lamp 10 with an output of 5 W. FIG. 3a shows the bulbs in the off state. In FIG. 3b, the single filament lamps 10 and dual filament lamps 9 are switched on at the low output level of 5 W to form the taillight. Each reflector pair appears as a uniform, circular rear light. The separating walls 5 and 6 are not noticeable here. In FIG. 3c, the brake light is additionally switched on as a result of brake pedal actuation in that the dual filament lamp 9 in reflector 1 is switched over to its high output level, or its high output level is switched on in addition to the low output level. The brake light shines significantly more intensely than the taillight and distinguishes itself noticeably therefrom. FIG. 3d shows the operating state in which the rear fog light is switched on, to which end the dual filament lamp 9 in the reflector 4 is operated at its high output level, either alone or additionally. The rear fog light shines as intensely as the brake light, but is easily distinguished therefrom by the separation (A), which is maintained, especially since the brake light is only illuminated intermittently. The operating states shown in FIGS. 3c and 3d with respect to the brake light and rear fog light are also established when the taillight is not turned on. In this case, FIG. 3a is the starting state rather than FIG. 3b.

Figures 4A, 4B, 4C, 4D:
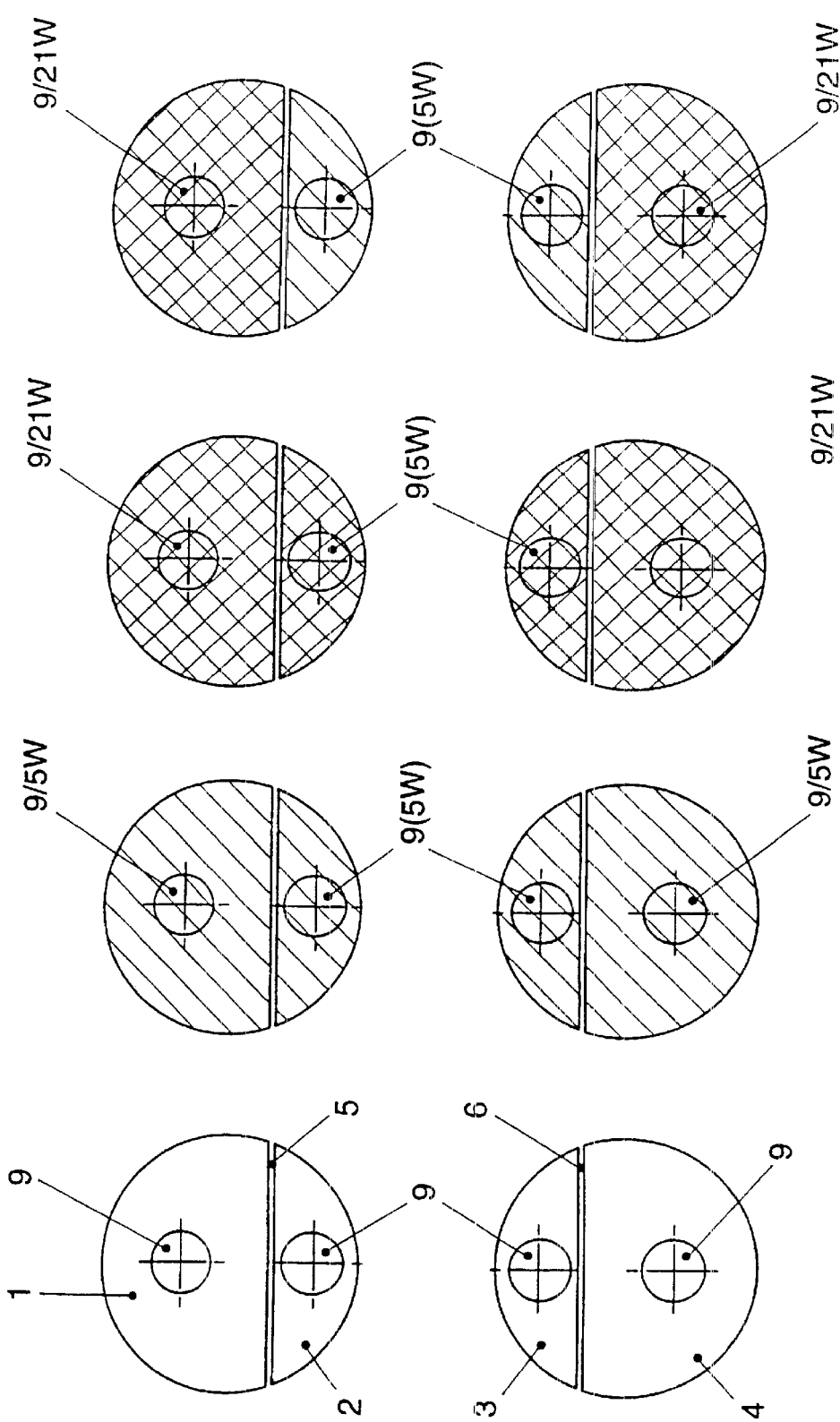
FIGS. 4a–4d show an alternate operation of the taillight, brake light and rear fog light in the rear light unit from FIG. 1 in different operating states.

In FIGS. 4a–4d, all reflectors are equipped with a dual filament lamp 9 with 5 W and 21 W outputs. FIG. 4a shows the bulbs in the off state. FIG. 4b shows taillight only operation; all dual filament lamps 9 are turned on at their 5 W output to form this light. During braking, all dual filament lamps 9 are switched over to 21 W, or the high output level of 21 W is additionally turned on, so that the taillight is completely overlaid by the brake light (FIG. 4c). For the case where the rear fog light is in use, which light is formed by the reflector 4 and the associated dual filament lamp 9, switched to or additionally operated at 21 W, the brake light is not formed by all reflectors 1–4, but only by the reflector 1 and the associated dual filament lamp 9 switched to or additionally operated at 21 W, as shown in FIG. 4d. The operating states shown in FIGS. 4c and 4d with respect to the brake light and rear fog light are also established when the taillight is not turned on. In this case, FIG. 4a is the starting state rather than FIG. 4b.

Figure 5:
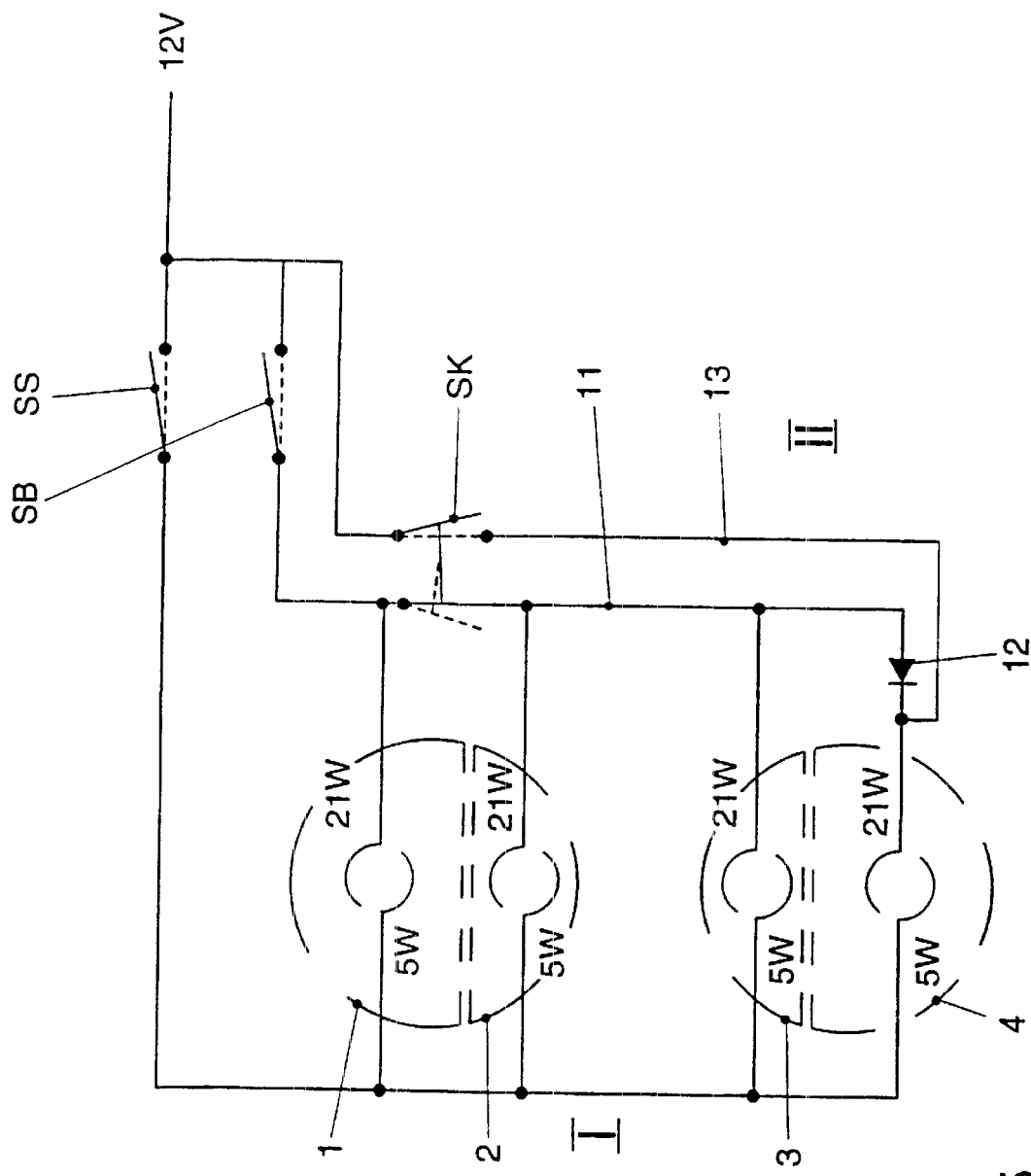
FIG. 5 shows a first circuit for the rear light unit of FIG. 1.

FIG. 5 shows a first circuit system for a rear light unit with four reflectors 1–4 to form the taillight (reflectors 1–4), the brake light (reflectors 1–4, reflector 1 alone when the rear fog light is used), and the rear fog light (reflector 4). A bulb 9 with output levels of 5 W and 21 W is associated with each reflector 1–4. When the rear fog light (reflector 4) is not used, all bulbs 9 are operated at the high output level of 21 W to form the brake light (reflectors 1–4), and when the rear fog light (reflector 4) is used, only the bulb 9 of the reflector 1, which is arranged at the legally required minimum separation (A) from the rear fog light, is used to form the brake light. To this end, the circuit system has two circuits I and II, of which circuit I supplies the bulbs 9 at the 5 W output level via a tail light switch SS. The circuit II has a first line 11 with a brake light switch SB, to which are connected all bulbs 9, wherein a diode 12 is arranged ahead of the bulb 9 of the reflector 4 to ensure passage of current in only one direction. There is also provided a second line 13, through which only the bulb 9 of the reflector 4 is supplied with current, as well as a (crossover) switch SK which stands in operative connection with both lines 11 and 13.

By means of the taillight switch SS and the circuit I, all bulbs 9 are switched on or off at the low 5 W output level. If the brake light switch SB is actuated (closed) when the taillight is switched off and the rear fog light is not used—the position of the fog light switch SK is such that line 13 is interrupted and line 11 is closed—then all bulbs 9 are supplied with current at the 21 W output level, and all reflectors 1–4 form the brake light.

When the taillight is switched on—taillight switch SS is closed, and all bulbs 9 are operated at 5 W and form the taillight—and the rear fog light is not used, then all bulbs 9 are additionally operated at the 21 W output level when the brake light switch SB is actuated (closed).

When the fog light switch SK is actuated with the taillight switched on (or off), resulting in closure of the line 13 and interruption of the line 11, the rear fog light is switched on in that the bulb 9 in reflector 4 runs additionally (or exclusively) at 21 W. Interruption of the line 11 has the result that the bulbs 9 of the reflectors 2 and 3 at the output level 21 W are no longer supplied with current. The bulb 9 of the reflector 4 is likewise no longer supplied through the line 11, but is supplied through the line 13. So that current supply over this line 13 to the bulbs 9 of the reflectors 2 and 3 is prevented, diode 12 is placed in the line 11. If the brake light switch SB is actuated now, only the bulb 9 in the reflector 1 is supplied with power at the 21 W output level and used to form the brake light. If the fog light switch SK is actuated, so that the rear fog light (reflector 4) is switched off and the line 11 is closed again, the bulbs 9 of all reflectors 1–4 are again available for forming the brake light.

Figure 6:
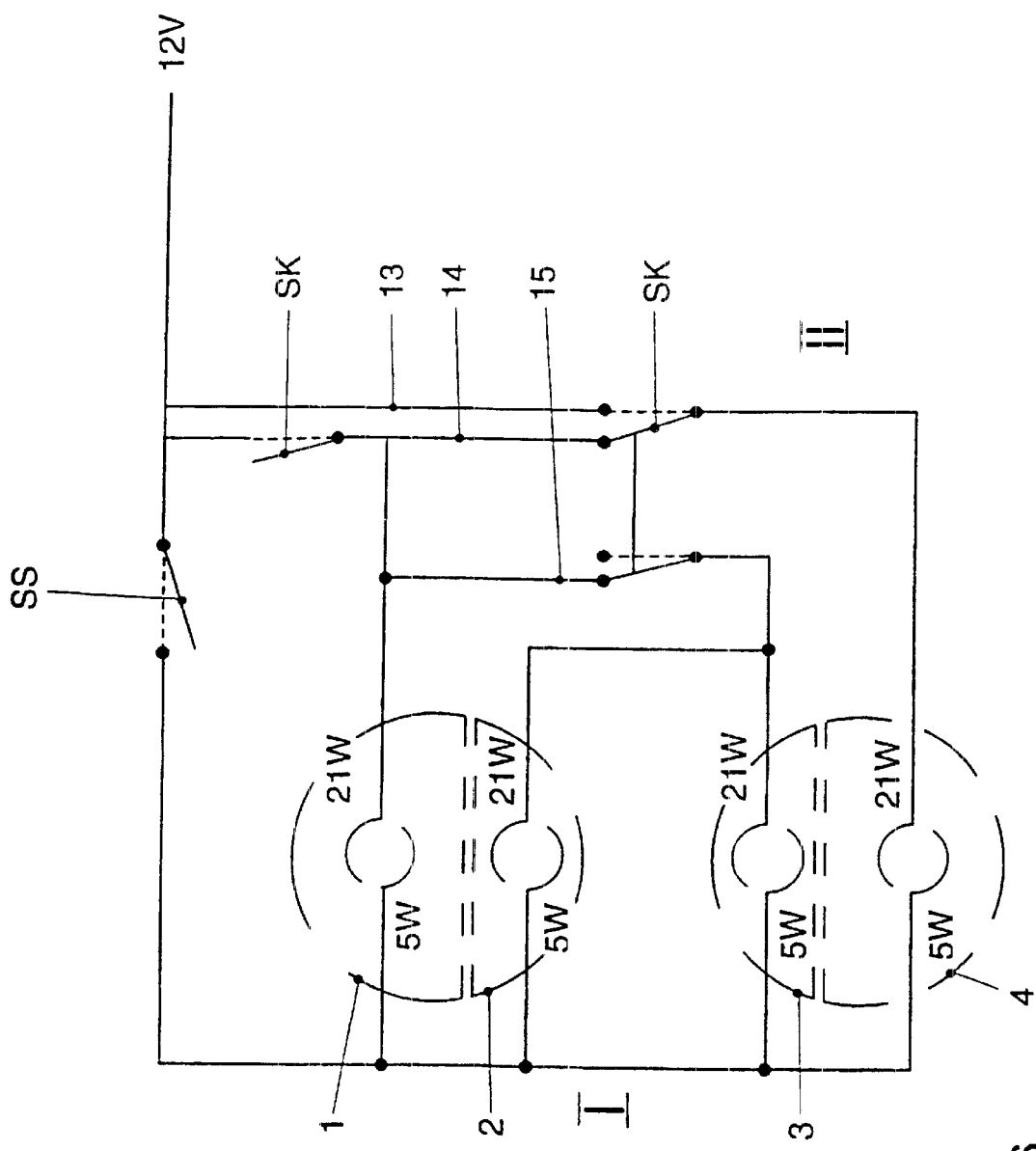
FIG. 6 shows a second embodiment of a circuit for the rear light unit.

FIG. 6 shows another embodiment of a circuit system with a fog light switch SK, which functions in similar fashion to the one described above. In contrast, however, the switch SK in the circuit II either closes the connection to the rear fog light (reflector 4), or when this connection is interrupted, it closes two contacts in the lines 14 and 15, which ensure the power supply to the bulbs 9 of the reflectors 2–4. When the brake light switch SB is actuated while the fog light switch SK is in the latter position—i.e., the contacts in the lines 14 and 15 are closed, and the line 13 is open—the bulbs 9 of all reflectors 1–4 are supplied with power in the 21 W output level and used to form the brake light. In the case when the fog light switch SK is closed, when the contact in line 13 is closed and the rear fog light (reflector 4) is alight while the lines 14 and 15 are interrupted, and the brake light switch SB is actuated, then only the bulb 9 of the reflector 1 is used for the brake light at 21 W.

Figure 7:
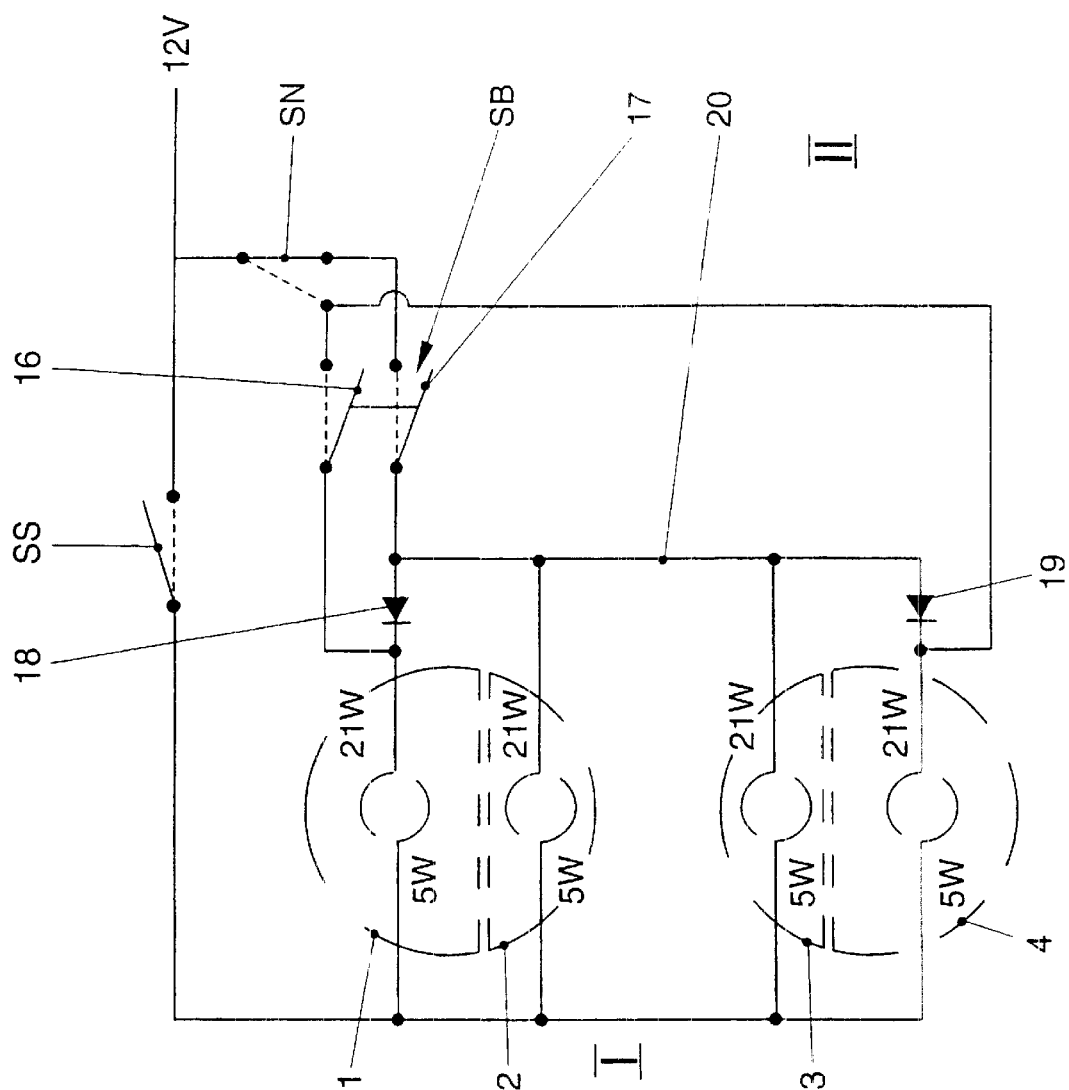
FIG. 7 shows a third embodiment of a circuit for the rear light unit.

Finally, FIG. 7 shows another alternative embodiment of a circuit system for the rear light unit in accordance with the invention. In this circuit arrangement, the electrical circuit II has a rear fog light switch SN that is connected to the rear fog light (reflector 4) in one of two possible positions and at the same time is connected to a first switching element 16 of the brake light switch SB that is coupled only to the lamp of reflector 1. In its other position (switching position shown in FIG. 7), when the connection to the rear fog light (reflector 4) is interrupted, the rear fog light switch SN is connected to a second switching element 17 of the brake light switch SB that is connected to all reflectors 1–4. Inserted in each of the connections to the bulbs 9 of the reflectors 1 and 4 is a diode 18 or 19 in order to ensure that current flows in only one direction.

When the rear fog light (reflector 4) is switched on by the rear fog light switch SN, passage of current to the reflectors 1–3 over the line 20 is prevented. Actuation of the brake light switch SB causes power to be supplied through the switching element 16 to the bulb 9 of the reflector 1 to form the brake light. When the rear fog light is not used (position shown in FIG. 7) and the brake light switch SB is actuated (closed) with its two switching elements 16 and 17, the bulbs 9 of all reflectors 1–4 are supplied with current and used to form the brake light.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

We claim:

1. A rear light unit for a vehicle comprising at least four reflectors arranged in a row, a bulb for illuminating each of said reflectors, wherein the bulbs for illuminating at the least end reflectors in said row are arranged to provide two levels of illumination, including a first bulb for illuminating a first end reflector at a higher level of illumination to form a brake light and a second bulb for illuminating a second end reflector at a higher level of illumination to form a rear fog light, and wherein the first and second end reflectors are separated by a distance corresponding to a required minimum spacing.

2. A rear light unit as specified in claim 1 wherein all of said bulbs are arranged to provide two levels of illumination and wherein there is provided a circuit for illuminating all of said bulbs at a higher level of illumination as a brake light when said rear fog light is not in use and illuminate only said first bulb at a higher level of illumination as a brake light when said rear fog light is in use.

3. A rear light unit as specified in claim 2 wherein said circuit comprises a brake light switch and a fog light switch, wherein said fog light switch has two positions, a first position wherein a power supply is connected to a second of said bulbs to provide higher illumination therefrom and wherein said brake light switch is connected to provide power from said power supply to said first bulb to provide higher illumination therefrom when said brake light switch is activated, and a second position wherein said power supply is disconnected from said second bulb and wherein said brake light switch is connected to provide power from said power supply to all of said bulbs to provide higher illumination therefrom when said brake light switch is activated.

4. A rear light unit as specified in claim 3 wherein, when said fog light switch is in said second position, said brake light switch is connected to said second bulb by a diode and when said fog light switch is in said first position, said power supply is connected to said second bulb without said diode.

5. A rear light unit as specified in claim 3 wherein when said fog light switch is in said second position said brake light switch is connected to said first bulb by a diode and when said fog light switch is in said first position said brake light switch is connected to said first bulb without said diode.

6. A rear light as specified in claim 1 wherein said bulbs having two levels of illumination comprise dual filament bulbs.

7. A rear light as specified in claim 1 wherein each of said first and second end reflectors and an adjacent reflector form a circular area having a separating wall formed as a straight web, and wherein said webs for said first and second end reflectors are parallel and separated by said required minimum spacing.

8. A rear light as specified in claim 7 wherein said circular areas are separated vertically one above another, and wherein a fifth reflector for a back-up light is arranged between said circular areas, and wherein a sixth reflector for a directional signal is arranged horizontally adjacent said fifth reflector.

9. A rear light as specified in claim 8 wherein there is provided a cylindrical dispersion lens associated with at least two central reflectors of said row of four reflectors, said fifth reflector and said sixth reflector.

* * * * *